Nov. 24, 1970 F. A. MESSNER, JR 3,543,250

NON-DESTRUCTIVE THIN FILM MEMORY DRIVE ARRANGEMENT

Filed May 27, 1968

INVENTOR
FRED A. MESSNER, JR

BY Rene A. Kuypers
ATTORNEY

United States Patent Office 3,543,250

Patented Nov. 24, 1970

3,543,250

NON-DESTRUCTIVE THIN FILM MEMORY DRIVE ARRANGEMENT

Frederick A. Messner, Jr., East Norriton, Pa., assignor to Sperry Rand Corporation, New York, N.Y., a corporation of Delaware Filed May 27, 1968, Ser. No. 732,178

Int. Cl. G11c *11/14, 19/00*

U.S. Cl. 340—174 11 Claims

ABSTRACT OF THE DISCLOSURE

This invention relates to an arrangement for obtaining a greater output from a thin film memory cell having the property of uniaxial anisotropy by rotating the magnetization to the 90° position without destroying the information stored thereat.

BACKGROUND OF THE INVENTION

The field of this invention is thin film memory devices and in particular, the invention relates to a thin film memory device of the plated wire type.

Known prior art information transfer techniques from one memory location to another memory location without destroying the information in the first location such as disclosed in U.S. patent application S.N. 466,904 by Woo F. Chow have not been entirely satisfactory. This results from the fact that the impedance between the two memory locations is too high to generate sufficient current for the information transfer. On the other hand, known prior art techniques to drive a thin film memory device very hard to generate more current without destroying the information stored thereat such as described in the article "Magnetic Film Devices Using Passive Loading" published in the Journal of Applied Physics, Supplement to volume 32, No. 3, March 1961 has required an R-L loading arrangement. This also has not been entirely satisfactory in view of the complication and expense of adding this type of loading.

SUMMARY OF THE INVENTION

This invention comprises a technique for driving a thin film memory device so that the magnetization is driven to the approximately 90° position without destroying the information stored thereat. It should be noted that when a conventional thin film memory cell having the property of uniaxial anisotropy is driven to the 90° position it destroys the information since this position is unstable and causes the film to break up into a plurality of magnetic domains. The magnetization is driven to the 90° position with a current pulse whose duration is such that the circulating current which is developed terminates just prior to that of the driving pulse. Therefore, not only is the circulating current of a relatively high magnitude due to the 90° rotation but it also serves to rewrite the information in the memory location which has been effectively destroyed since the circulating current is the proper direction for a re-write operation.

Accordingly, it is an object of this invention to provide a new and improved memory arrangement.

It is yet another object of this invention to provide a new and improved memory arrangement which develops a higher output signal.

It is yet another object of this invention to provide a new and improved arrangement for transferring information from one memory location to another memory location.

DESCRIPTION OF THE PREFERRED EMBODIMENTS

Figure 1:
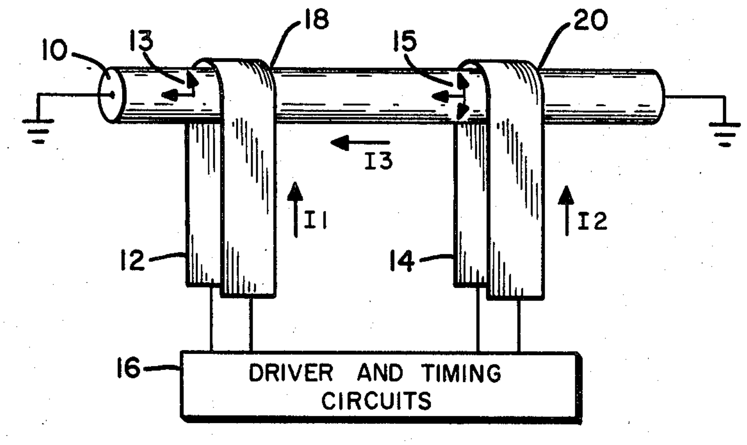
FIG. 1 comprises a typical memory arrangement as used in this invention.

Referring now to the drawings and in particular to FIG. 1, there is depicted a plated wire memory element 10 which comprises a five mil diameter beryllium-copper substrate upon which is coated a 10,000 angstrom thickness of permalloy. The permalloy coating has an approximate composition comprising 80% nickel and 20% iron. Positioned orthogonally to the plated wire 10 are the drive or solenoid straps 12 and 14. At the intersections of plated word 10 and the drive strap 12 and 14 are the respective bit locations 18 and 20 whereat binary information (i.e., a "1" or a "0") is stored. Connected to the respective drive straps 12 and 14 are the driver and timing circuits 16. These circuits are conventional pulse circuits for energizing the drive straps 12 and 14 at the proper time as will be discussed in greater detail hereinafter.

The plated wire 10 has its permalloy coating deposited in the presence of the circumferential magnetic field so as to impart the property of uniaxial anisotropy to the plating. In other words, the uniaxial anisotropy property causes the magnetization vectors 13 and 15 (only one of which is shown) at the respective bit positions 18 and 20 to be oriented in the circumferential direction either clockwise or counter-clockwise around the EASY axis of magnetization. In the figure shown and as viewed from the right-hand end of the plated wire 10 the magnetization vectors 13 and 15 are shown as being oriented in a clockwise direction and this will be considered as a binary "1."

In a conventional plated wire memory operation, when for example the current I1 flows in the upward direction in the uppermost portion of the drive strap 12 and completes the circuit via the undermost portion of the strap, the magnetization vector 13 is rotated to an angle which approximates 70°. The magnetization 13 is only rotated to the 70° position to prevent destruction of the information stored at the bit location 18. However, a 70° rotation of the magnetization limits the amount of output obtained from a bit location or memory cell. This has the effect of requiring a somewhat critical design of a sense amplifier (not shown) across the ends of a wire when the latter is used in the random access mode.

Figure 2:
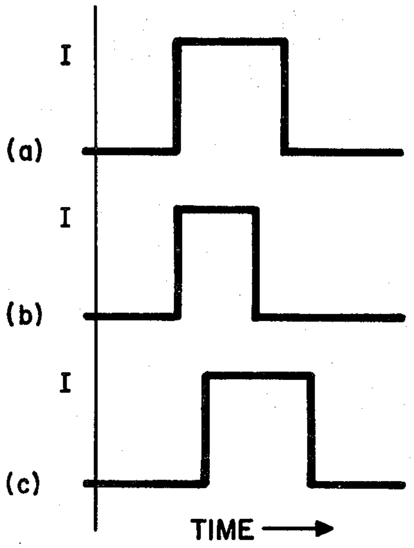
FIG. 2 comprises the idealized waveforms which are utilized in the performance of this invention.

By referring to FIG. 2 it will be shown that the magnetization 13 at the location 18, for example, can be driven to the 90° position or the HARD axis of magnetization without destroying the information stored thereat so that a greater output may be obtained.

In operation, the idealized current pulse shown in FIG. 2*a* is applied to the strap 12 by the driver and timing circuit 16. This causes the current I1 to flow in an upward direction in the uppermost portion of the drive strap 12 and completes the circuit through the undermost portion. A magnetizing force is generated underneath the drive strap 12 in such a direction and with a magnitude so as to cause the magnetization vector 13 to rotate into the HARD axis of magnetization which is along the longitudinal axis of the wire 10. In view of the 90° rotation a high output current pulse I3 (FIG. 2*b*) is generated within the wire 10 in the direction shown. It should be noted that the pulse shown in FIG. 2*a* is in its idealized form. The current I3 flows in a right to left direction in view of Lenz's law whereby a current is generated in a direction to oppose the reduction of flux in the clockwise direction by the rotation of the magnetization vectors 13 into the HARD axis.

The current pulse I3 (FIG. 2*b*) induced in the plated wire 10 begins its return to zero sooner than does the driving pulse (FIG. 2*a*) since the magnetization vector 13 is swung very fast from its quiescent position along the EASY axis to the HARD axis. Once the magnetization vector reaches the 90° position which occurs during the rise time of the driving pulse (FIG. 2*a*) the current begins to return to zero since there is no longer any change in flux. In other words, the current I3 begins to drop in magnitude before the pulse shown in FIG. 2*a* reaches its maximum point. However, since the plated wire 10 is essentially an inductive element because of the magnetic plating surrounding the wire substrate, the current actually returns to zero over a relatively long period of time. During the fall time of the driving pulse (FIG. 2*a*), the magnetization vector 13 returns to the EASY axis position and thereby causes a negative current (opposite to I3) to be generated in the plated wire 10. As a result, this negative current actually subtracts from the positive current that is returning to zero very slowly as discussed above. Applying the above discussion to the idealized pulses shown in FIGS. 2*a* and 2*b*, it is shown that the current I3 (FIG. 2*b*) begins to return to zero before the strap current I1 returns to zero. This pulse relationship has the following effect.

Although the current signal I1 causes the magnetization vector 13 to be rotated to the 90° position or the HARD axis of magnetization thereby effectively destroying that information, nevertheless the circulating current I3 in the wire 10 is in a direction and is timed so that is actually rewrites the destroyed information back into the bit location 18. In other words, while the magnetization vectors are held in the 90° position by the pulse I1 (FIG. 2*a*), the bit steering current I3 (FIG. 2*b*) is timed so that it tips the magnetization 13 back into the clockwise direction. Furthermore, the pulse I1 terminates immediately after the magnetization 13 has been tipped to complete the re-write operation.

Therefore, this invention has achieved an extremely high output signal (FIG. 2*b*) which is obtained by the 90° rotation of the magnetization vector 13 without destroying that information. This is significant in that it enables a higher output signal to be fed into a sense amplifier which is connected across the ends of the plated wire 10 (not shown) in the event that the memory element is used in a conventional random access memory arangement.

The instant invention can be readily utilized in an information transfer or bit steering mode. Accordingly, the current pulse shown in FIG. 2*a* is applied to the drive strap 12 by the driver and timing circuit 16 (FIG. 1). This causes the current I1 to flow in the upward direction in the uppermost portion of the solenoid 12 and return via the undermost portion to complete the circuit. The current I1 flowing in the solenoid or word strap 12 causes the magnetization vectors 13 to rotate to the 90° or HARD axis position as previously discussed. Accordingly, the current I3 flows in the plated wire 10 so as to oppose the reduction of the flux in the clockwise direction by this rotation. The signal I3 it should be noted and as discussed above is of a higher magnitude than conventionally obtained.

After the application of the drive signal (FIG. 2*a*) to the strap 12, the drive signal (FIG. 2*c*) is applied to the strap 14. This current pulse causes the current I2 to flow in the uppermost portion of the solenoid 14 and returns via the undermost portion. The current I2 causes the magnetization vector 15 at the bit location 20 to be rotated to an angle which substantially coincides with the HARD axis of magnetization. By rotating the magnetization vectors 15 from the EASY to the HARD axis of magnetization, the bit position 20 is conditioned to have information transferred from bit location 18 to bit location 20.

The circulating current I3 (FIG. 2*b*) is terminated before the pulse I1 is terminated for the reasons discussed above. Furthermore, signal I3 is terminated before the signal I2 (FIG. 2*c*). Therefore, I3 comprises a bit steering current which tips the magnetization vector 15 (which are oriented in the 90° position) so that it assumes a clockwise direction. Thus, the binary "1" stored at the bit position 18 has been transferred to the bit position 20 and the "0" thereat has been switched to a "1." The pulse I2 (FIG. 2c) is terminated shortly after the magnetization 15 has been steered to the clockwise direction.

Since the magnetization 13 at the bit position 18 has also been rotated to the HARD axis it should be noted that the binary "1" information stored thereat was effectively destroyed. However, as previously discussed the current I3 (FIG. 2*b*) is terminated prior to the termination or fall time of the pulse I1 (FIG. 2*a*) that pulse I3 actually steers the magnetization back to the clockwise direction as previously discussed. In other words, not only does I3 transfer information from bit location 18 to bit location 20 but it also rewrites the information back into bit location 18 after it has been effectively destroyed.

Accordingly, it is seen that a larger circulating current is developed by the instant invention and the bit steering operation is greatly facilitated since information can be transmitted over a longer distance. Furthermore, the mode of operation is completely non-destructive. Another advantage that accrues from this invention is that the larger circulating currents which are developed because of the 90° rotation of the magnetization allow smaller strap widths to be used and thereby the bit density can be increased. Larger strap widths are conventionally used to switch more plating in order to obtain more current output. In addition, the operation of this mode is significantly insensitive to skew (i.e., where the magnetization does not line up along the EASY axis) of the wire.

The embodiments of the invention in which an exclusive property or privilege is claimed are defined as follows:

1. The combination comprising:
(a) a memory cell for storing information;
(b) a sense line coupled to said memory cell;
(c) drive means juxtaposed to said memory cell and to said sense line, the intersection of said memory cell and said drive means comprising a bit location;
(d) a signal being applied to said drive means which causes a magnetic flux to be coupled to said memory cell to generate a circulating current in said sense line, said signal applied to said drive means being such as to cause the destructive read-out of said information stored in said memory cell, the timing of said circulating current with respect to said signal applied to said drive means being such as to re-write the destroyed information in said memory cell.

2. The combination in accordance with claim 1 wherein said memory cell comprises a ferromagnetic coating having the property of uniaxial anisotropy.

3. The combination in accordance with claim 2 wherein said ferromagnetic coating comprises permalloy which is approximately 80% nickel and 20% iron.

4. The combination in accordance with claim 3 wherein said permalloy coating is deposited on said wire substrate such that an EASY axis is oriented circumferentially and a HARD axis is oriented longitudinally.

5. The combination in accordance with claim 3 wherein said wire substrate is copper-beryllium.

6. The combination in accordance with claim 4 wherein said wire has a diameter of approximately 5 mils.

7. The combination in accordance with claim 3 wherein said drive means is oriented substantially orthogonal to said wire.

8. The combination in accordance with claim 1 wherein said drive line comprises an approximately 15 mil wide copper line.

9. The combination in accordance with claim 1 wherein a second memory cell is coupled to said sense line and a second drive line is juxtaposed thereto, the intersection of said second memory cell and said second drive line defining a second bit position.

10. The combination in accordance with claim 9 wherein a signal is applied to said second drive line, the circulating current in said sense line and the signal applied to said second drive line being timed to transfer the information at said first position to said second bit position.

11. (a) a plated magnetizable wire having the property of uniaxial anisotropy, said wire having an EASY axis which is circumferential and a HARD axis which is longitudinal; (b) at least first and second drive means juxtaposed and orthogonally arranged to said wire, the intersection of said drive means and wire comprising a first and second bit position whereat binary information is stored; (c) current means applied to said first drive means to rotate the magnetization at said first bit position from said EASY to approximately said HARD axis to cause a circulating current to flow in said wire and the destructive read-out of the information stored in said first bit position; (d) current means applied to said second drive means to rotate the magnetization at said second bit position from said EASY toward said HARD axis to condition said bit position to receive an information transfer; said current means being applied in time sequence such that the circulating current flowing in said wire re-records the destroyed information in said first bit and transfers the information in said first bit location to said second bit location.

References Cited

UNITED STATES PATENTS

| | | | |
|---|---|---|---|
| 3,371,326 | 2/1968 | Fedde | 340—174 |
| 3,428,955 | 2/1969 | Oshima et al. | 340—174 |
| 3,441,919 | 4/1969 | Turczyn | 340—174 |

STANLEY M. URYNOWICZ, Jr., Primary Examiner

K. E. KROSIN, Assistant Examiner